United States Patent [19]

Malloy et al.

[11] Patent Number: 4,536,301

[45] Date of Patent: Aug. 20, 1985

[54] ENHANCED OIL RECOVERY

[75] Inventors: Thomas P. Malloy, Lake Zurich; Raymond J. Swedo, Mount Prospect, both of Ill.

[73] Assignee: UOP Inc., Des Plaines, Ill.

[21] Appl. No.: 521,282

[22] Filed: Aug. 8, 1983

Related U.S. Application Data

[63] Continuation-in-part of Ser. No. 297,910, Aug. 31, 1981, abandoned.

[51] Int. Cl.$^3$ .......................... C09K 3/00; E21B 43/22
[52] U.S. Cl. ................... 252/8.55 D; 166/275
[58] Field of Search ................... 252/8.55 D; 166/275

[56] References Cited

U.S. PATENT DOCUMENTS

| | | | |
|---|---|---|---|
| 3,874,454 | 4/1975 | Clark et al. | 252/8.55 D |
| 4,008,165 | 2/1977 | Maddox, Jr. et al. | 252/355 |
| 4,013,569 | 3/1977 | Chiu et al. | 252/8.55 D |
| 4,214,999 | 7/1980 | Carlin et al. | 252/8.55 D |
| 4,460,481 | 7/1984 | Schievelbein | 252/8.55 D |

*Primary Examiner*—Theodore Morris
*Attorney, Agent, or Firm*—Thomas K. McBride; Raymond H. Nelson; William H. Page, II

[57] ABSTRACT

The recovery of residual oil which is found in subterranean reservoirs may be accomplished by utilizing an aqueous surfactant slug to reduce the interfacial tension between oil and water. An effective surfactant slug which may be used will comprise a mixture of: (1) from about 1 to about 10% of a sulfonate of a mixture of mono- and dialkyl-substituted aromatic hydrocarbon which has been obtained by the alkylation of an aromatic hydrocarbon with an olefinic hydrocarbon in the presence of a hydrogen fluoride catalyst; (2) a lower alkyl alcohol which possesses from about 3 to about 6 carbon atoms; and (3) a nonionic cosurfactant comprising an ethoxylated n-alcohol which possesses from about 12 to about 15 carbon atoms.

10 Claims, No Drawings

ENHANCED OIL RECOVERY

CROSS-REFERENCE TO RELATED APPLICATION

This application is a continuation-in-part of copending application Ser. No. 297,910 filed Aug. 31, 1981, now abandoned, all teachings of which are incorporated herein by reference thereto.

BACKGROUND OF THE INVENTION

It is well known in the petroleum field that petroleum which is found in subterranean reservoirs is recovered by many different methods. The primary method of petroleum recovery is by the primary recovery means which employs natural forces such as pressure, either by the petroleum itself or by the presence of gases, whereby petroleum is forced from the subterranean reservoir to the surface and recovered. Subsequent to the recovery of the petroleum by the primary means, due to the dissipation of the natural or gaseous pressure, more of the petroleum in the reservoir may be recovered by a secondary process in which water is forced into the reservoir to provide the pressure necessary to force the petroleum from the reservoir to the surface.

At some point in the recovery of petroleum, a state is reached in which it is more costly to use the water pumped in relative to the amount of oil which is recovered by this method. However, inasmuch as a relatively large amount of petroleum may still be present in the reservoir, either in a pool or by being trapped in interstices of relatively porous rock, it is necessary to effect the recovery of the petroleum by a tertiary method. The tertiary method or the enhanced oil recovery method may be effected by many different methods. For example, one tertiary recovery method may be thermal in nature in which steam is pumped into the reservoir to force the oil to the surface. However, some oil may be lost due to burning and, by combining the cost of the lost oil with the cost of the equipment and energy necessary to form the steam, may render such a method economically unattractive to operate. A second tertiary recovery method may comprise a fire flood method in which a portion of oil is ignited to create gases as well as reducing the viscosity of the heavy crude with a concomitant increase in pressure to force the oil from the reservoir. However, as in the method previously discussed, the drawback to this method is in the fact that some of the assets are being destroyed, thus increasing the cost of the operation. A third method for enhanced oil recovery is in the use of carbon dioxide to provide the pressure required to force the oil to the surface. In this method, the carbon dioxide is pumped into the oil reservoir to dissolve some of the heavies present which, in turn, will reduce the viscosity and allow the oil to reach the surface. The disadvantage which is present when utilizing such a method is the requirement for relatively expensive equipment to produce the carbon dioxide. In addition, the method is dependent upon the ready availability of carbon dioxide. Yet another method for enhanced oil recovery is found in the use of chemicals such as water-soluble polymers including polyacrylamide, biopolymers, etc. These polymers will increase the viscosity of the water in the solution and render the mobility ratio of water to oil whereby the solution will act more favorably as a plug.

Another method of effecting an enhanced oil recovery is by utilizing surfactants as a plug, whereby the oil which is present in the reservoir may be recovered by injecting an aqueous fluid containing a surfactant or a combination of surfactants along with other compounds into the reservoir. The use of surfactants in this system is necessary inasmuch as water alone does not displace petroleum with a relatively high degree of efficiency. This occurs due to the fact that water and oil are relatively immiscible and, in addition, the interfacial tension between water and oil is relatively high. The use of surfactants will lower or reduce the interfacial tension between the water and the oil, thus reducing the force which retains the oil which has been displaced in capillaries.

The prior art is replete with various surfactants which have been used in this tertiary system for the recovery of petroleum. One type of surfactant which has been employed in many processes involves a petroleum sulfonate. The sulfonated petroleum fractions have been obtained by sulfonating a crude oil. However, this crude oil feedstock contains a vast and varied number of chemical structures including aromatic hydrocarbons, paraffinic hydrocarbons, olefinic hydrocarbons, to name a few. However, a disadvantage in utilizing crude oil as a feedstock is that the feedstock usually does not contain a major portion of aromatic compounds which are the effective material which is sulfonated. As will hereinafter be shown, by utilizing certain linear alkylbenzene sulfonates which have been prepared from certain linear alkenes utilizing a specific type of catalyst, it is possible to obtain products which possess the desired physical characteristics necessary for lowering the interfacial tension between oil and water when used as one component of a surfactant slug.

As was previously discussed, prior U.S. patents teach the use of these petroleum sulfonates as one component of a surfactant mixture which may be used in a surfactant oil recovery process. For example, U.S. Pat. No. 4,214,999 discloses a surfactant fluid for use in flooding subterranean formations which contain petroleum comprising petroleum sulfonates possessing certain average equivalent weights and a solubilizing cosurfactant such as ethoxylated alkanols, sulfates or sulfonates. U.S. Pat. No. 4,013,569 also discloses a surfactant system for the recovery of petroleum utilizing a relatively water soluble aromatic ester polysulfonate as one component in the system. Another U.S. patent, namely U.S. Pat. No. 4,008,165, utilizes an aqueous surfactant containing fluid which includes a mixture of three surfactant materials including a sulfonate surfactant derived from an alkyl or alkylaromatic radical along with a phosphate ester surfactant and a sulfonated betaine, the system also being utilized in an oil recovery process.

Other U.S. patents disclose various water flooding methods for recovering oil such as in U.S. Pat. No. 3,874,454. This patent is concerned mainly with overbased formulations of sulfonates which are mixtures of alkali metal sulfonates plus a base component wherein the ratio: "weight of excess base component/weight of alkali metal sulfonate" has a value of about 0.03 to 2.0. These formulations are not merely neutralized but, as the term connotes, are overbased by an excess of the base component. The source of these sulfonates are petrochemical cuts of relatively ill-defined composition and may contain, among other products, such compounds as mono- or dialkylbenzenes as well as alkyl naphthalenes and alkylated tetrahydrated naphthalenes. U.S. Pat. No. 3,981,361 discloses an oil recovery method using a microemulsion containing a surfactant comprising synthetic sulfonates of o-xylene or toluene sulfonates. Likewise, U.S. Pat. No. 4,058,467 describes a method of oil recovery employing as a surfactant a carbon dioxide-saturated alkali metal hydrocarbon sulfonate water flooding additive. Again, the sulfonated products are overbased and, in addition, as hereinbefore set forth, are saturated with carbon dioxide.

As will hereinafter be shown in greater detail, it has now been found that by utilizing an aqueous surfactant slug in which one component thereof comprises sulfonates of a mixture of mono- and dialkyl aromatic hydrocarbons which have been obtained in an alkylation process utilizing a hydrogen fluoride catalyst, it is possible to effect a recovery of oil from a subterranean reservoir in a more efficient manner with a greater yield of tertiary oil products than has been obtained by utilizing surfactant slugs containing surfactants which are not the products of this type of alkylation reaction.

In one aspect an embodiment of this invention resides in a process for an enhanced oil recovery wherein an aqueous surfactant slug is introduced into a subterranean reservoir of oil to displace said oil from said reservoir, said slug being in a sufficient amount to lower the interfacial tension between said oil and water, the improvement which comprises utilizing as said surfactant slug an aqueous mixture comprising (a) from about 1% to about 10% of a sulfonate of a mixture of mono- and dialkyl-substituted aromatic hydrocarbons prepared by the alkylation of an aromatic hydrocarbon with a straight or branched chain olefinic hydrocarbon containing from about 6 to about 22 carbon atoms in the chain in the presence of a catalyst comprising hydrogen fluoride at alkylation conditions, (b) from about 1% to about 10% of a lower alkyl alcohol containing from about 3 to about 6 carbon atoms, and (c) from about 0.1% to about 2% of a nonionic ethoxylated normal alcohol containing from about 12 to about 15 carbon atoms.

A specific embodiment of this invention is found in a process for the enhanced oil recovery utilizing an aqueous surfactant slug for reducing the interfacial tension between oil and water, said slug comprising a mixture consisting of neutralizing sulfonates of a mixture of monoalkyl and dialkyl-substituted aromatic hydrocarbons which have been prepared by the alkylation of benzene with an olefinic hydrocarbon in the presence of hydrogen fluoride at a temperature in the range of from about ambient to about 100° C. and a pressure in the range of from about atmospheric to about 50 atmospheres, said aromatic hydrocarbons being present in the reaction mixture in a molar ratio of about 3:1 to 1:10 moles of aromatic compound per mole of olefinic hydrocarbon, said sulfonate having been neutralized by the addition of a sodium compound, a lower alkyl alcohol containing from about 3 to about 6 carbon atoms, and a nonionic surfactant comprising an ethoxylated n-alcohol containing from about 12 to about 15 carbon atoms.

Other objects and embodiments will be found in the following further detailed description of the invention.

DETAILED DESCRIPTION OF THE INVENTION

As hereinbefore set forth, the present invention is concerned with a process for the recovery of oil from subterranean reservoirs utilizing an aqueous surfactant slug in which one component thereof comprises sulfonates of a mixture of mono- and dialkyl-substituted aromatic hydrocarbons which possess a low 2-aryl content. As was previously discussed, surfactant slugs which have been used in enhanced oil recovery processes contain, as one of the components of the slug, a sulfonated petroleum fraction. However, in contradistinction to this, the sulfonated dialkyl aromatic compounds which are utilized as one component of the surfactant slug of the present invention will enable the finished slug to possess the desired physical characteristics so that the system can lower the interfacial tension between the oil which is present in the subterranean reservoir and the water to values of the magnitude of $10^{-3}$ dynes/cm, thus making the system commercially attractive to use in the aforesaid enhanced oil recovery. In addition, the mono- and dialkyl-substituted aromatic hydrocarbons which are utilized in the surfactant slug will also possess the advantage of being able to tolerate the presence of sodium chloride which is usually present in the brine solution and which tends to precipitate out the sulfonates, especially the sulfonates which have been derived from petroleum. This precipitation of petroleum sulfonates will decrease the ability of the sulfonate to act as a surfactant for reducing the interfacial tension between the oil and water. Other advantages of the sulfonates of mono- and dialkyl-substituted aromatic hydrocarbons lie in the tolerances of the sulfonate for calcium and magnesium, and by preventing the exchange of the sodium ions which have been used to neutralize the sulfonate with the subsequent precipitation hereinbefore discussed, as well as the advantage of possessing a relatively good solubility of the sulfonate in water.

As hereinbefore set forth, the surfactant slug which is utilized in the process for the enhanced recovery of oil from a subterranean reservoir contains as one component thereof a sulfonate of mono- and dialkyl-substituted aromatic hydrocarbons which possess a low 2-aryl content. The olefinic hydrocarbons which are utilized as alkylating agents to prepare the desired compounds may be linear or branched chain in configuration. The linear alkenes which are preferred as starting materials in the formation of mono- and dialkylsubstituted aromatic hydrocarbons usually comprise a mixture of olefins which have been obtained by dehydrogenating normally liquid saturated hydrocarbons to form unsaturated hydrocarbons, the dehydrogenation being effected by utilizing a solid nonacidic catalyst containing a metal or a compound of a metal or mixtures thereof, the catalytic component of the catalyst usually being selected from Groups IVB and VIII of the Periodic Table. The olefinic product which is obtained by this type of dehydrogenation usually comprises olefins which contain from 10 to 22 carbon atoms in the chain and which, by virtue of the dehydrogenation process, possess a high degree of internal unsaturation, that is, the unsaturated bonds of the alkene being on carbon atoms which are not terminal to the chain. The type of olefins which are the preferred alkylating agents are those in which the internal unsaturation ranges from about 90% to about 94%, the remainder of said unsaturation being terminal.

The desired olefins may be separated from the hydrocarbon mixture containing unreacted alkenes by treating the hydrocarbon mixture in liquid phase with a fixed bed of a solid sorbent which may comprise an aluminosilicate. The olefins are adsorbed on the aluminosilicates and recovered.

Following this, the olefinic hydrocarbons which, as hereinbefore set forth, may also comprise a branched chain compound which has been obtained from other reactions, are utilized as alkylating agents for the production of mono- and dialkyl-substituted aromatic hydrocarbons. Suitable aromatic compounds which may be alkylated with the olefinic hydrocarbon will include benzene, naphthalene, anthracene or aromatic compounds containing lower alkyl substituents such as toluene, o-xylene, m-xylene, p-xylene, ethylbenzene, the isomeric diethylbenzenes, etc. It is also contemplated within the scope of this invention that aromatic compounds other than the hydrocarbons such as phenol and the isomeric cresols may also be alkylated according to the process herein described and utilized in the aqueous surfactant slug, although not necessarily with equivalent results. The alkylation of the mono- and dialkyl-substituted aromatic hydrocarbons which is desired to produce mono- and dialkyl-substituted aromatic hydrocarbons will be effected at alkylation conditions which will include temperatures in the range of from about ambient (20°–25° C.) to about 100° C. and pressures ranging from atmospheric to about 50 atmospheres, the subatmospheric pressures being afforded by the introduction of a substantially inert gas such as nitrogen, helium, argon, etc. into the reaction vessel. In order to promote the dialkylation of the aromatic compound, the reactants will be present in a mole ratio of from about 3:1 to about 1:10 moles of aromatic hydrocarbons per mole of olefinic hydrocarbons. In addition, the amount of hydrogen fluoride catalyst which is employed will be such that a ratio of 10:1 to 1:3 organic material to catalyst by weight is present. The alkylation of the aromatic hydrocarbon with the olefinic hydrocarbon may be effected in an appropriate apparatus such as an autoclave by charging the aromatic hydrocarbon to an autoclave containing the hydrogen fluoride catalyst followed by the addition of the olefinic charge stock. After allowing the alkylation to proceed at reaction conditions within the ranges hereinbefore set forth for a predetermined residence time which may range from about 0.1 to about 0.5 hours in duration, during which time the reaction mixture is subjected to continuous stirring, the heating is discontinued and, after return to room temperature, any excess pressure is discharged. At the end of the residence time, the mixture is allowed to separate into an aqueous layer and an organic layer, following which a separation of the two layers is effected and the organic layer is neutralized by the addition of caustic whereby an entrained or entrapped hydrogen fluoride present in the organic layer is recovered. The thus prepared mono- and dialkyl-substituted aromatic hydrocarbons which possess a low 2-phenyl content may then be sulfonated by treating the mono- and dialkyl-substituted aromatic hydrocarbons in an appropriate reaction flask with a sulfonating agent such as sulfur trioxide or sulfuric acid in the presence, if so desired, of an organic solvent which may include paraffins such as pentane, hexane, heptane, etc., and cycloparaffins such as cyclopentane, methylcyclopentane, cyclohexane, etc. As one example of a sulfonation process, the mono- and dialkyl-substituted aromatic hydrocarbons may be charged to a reaction flask along with the desired solvent and thereafter charging liquid sulfur trioxide under a nitrogen blanket to the reaction apparatus. The addition of the sulfur trioxide to the mono- and dialkyl-substituted aromatic hydrocarbons may be effected at ambient temperature or temperatures slightly in excess of ambient, that is, up to about 60° C. over a relatively long period of time which may range from 1 to 10 hours or more in duration. Upon completion of the desired reaction period, the mixture may then be neutralized by the addition of an alkaline component which may be selected from the group consisting of ammonium hydroxide or a salt or hydroxide of a metal of Group IA or IIA of the Periodic Table such as sodium hydroxide, potassium hydroxide, lithium hydroxide, magnesium hydroxide, calcium hydroxide, strontium hydroxide, ammonium carbonate, sodium carbonate, potassium carbonate, lithium carbonate, magnesium carbonate, calcium carbonate, strontium carbonate, etc. When an alkaline pH in excess of 7 is reached, water is added to the reaction mixture along with an equal amount of an alcohol such as isopropyl alcohol. After thorough agitation, the mixture is then heated to a temperature in the range of from about 50° to about 75° C. for a predetermined period of time and thereafter is allowed to cool. The alkaline sulfonate which separates upon cooling is then removed by conventional means such as filtration, centrifugation, etc. and after the mixture is allowed to settle, it will separate into two layers. The lower aqueous/alcohol layer may then be extracted with an organic solvent such as hexane until the extracts are colorless. The upper organic layer, along with the combined extracts, may then be washed with water which is added to the aqueous layer. Thereafter, the aqueous layer is allowed to evaporate to dryness or a drying means such as a steam bath is used to yield the neutralized sulfonate derivatives of mono- and dialkyl-substituted aromatic hydrocarbons.

A second component of the surfactant slug will comprise a cosurfactant, said cosurfactant consisting of a lower alkyl alcohol containing from about 3 to about 6 carbon atoms such as n-propyl alcohol, isopropyl alcohol, n-butyl alcohol, sec-butyl alcohol, n-amyl alcohol, sec-amyl alcohol, n-hexyl alcohol, sec-hexyl alcohol, etc.

It is also contemplated within the scope of this invention that a third component of the surfactant slug will comprise a nonionic surfactant comprising an ethoxylated normal alcohol containing from about 12 to about 15 carbon atoms in length. Specific examples of these alcohols will include ethoxy-n-dodecyl alcohol, ethoxy-n-tridecyl alcohol, ethoxy-n-tetradecyl alcohol, ethoxy-n-pentadecyl alcohol, etc. The amounts of the three components of the surfactant slug will usually comprise from about 1% to about 10% of the neutralized sulfonate of the mono- and dialkyl-substituted aromatic hydrocarbons, from about 1% to about 10% of the lower alkyl alcohol cosurfactant, and from about 0.1% to about 2% of the nonionic ethoxylated n-alcohol surfactant. In addition, if so desired, it is also contemplated within the scope of this invention that sodium chloride may also be present in an amount in the range of from about 1% to about 5%. However, the presence of this salt is not essentially necessary for the operation of the surfactant slug in lowering the interfacial tension between the petroleum and the slug.

By utilizing a surfactant slug containing the components hereinbefore described, it is possible to effect an enhanced oil recovery in which the petroleum which is still present in the subterranean reservoirs may be displaced from the reservoir and from the interstices of relatively porous rocks also present in an economically attractive manner.

The surfactant slug or system of the present invention may be formulated by admixing a predetermined amount of the aforesaid neutralized sulfonate derivatives of the mono- and dialkyl substituted aromatic hydrocarbons, the cosurfactant and the nonionic surfactant, said amounts being mixed in a water medium.

The water medium which is selected for the surfactant slug will usually consist of field water which, in many instances comprises a low gravity brine. The thus prepared surfactant slug is then utilized for a tertiary method of enhanced oil recovery. In effecting the enhanced oil recovery process, the subterranean reservoir containing the oil may be subjected to a preflush treatment with fresh water in order to displace the water which has been used in the secondary process and which may possess a high degree of salinity and/or hardness from the flow channels of the formation. Following the preflush treatment, the surfactant slug is injected until the desired volume of surfactant fluid is present in the petroleumcontaining formation. The surfactant slug, due to the presence of the various components including the sulfonates of a gas oil obtained by the thermal cracking of coal, will lower the interfacial tension between the oil and the water and thus assist in forcing the oil through the formation into the wells and through the wells to the surface for recovery thereof. Following the recovery of the oil, a further water injection is made into the formation, this water being sufficient to displace the surfactant and displaced oil so that the recovery of the oil is effected in such an amount as to render the process economically feasible.

As will hereinafter be shown in greater detail, by utilizing the particular mono- and dialkyl-substituted aromatic hydrocarbons which have been obtained from an alkylation process utilizing a hydrogen fluoride catalyst in a surfactant slug, it is possible to effect a tertiary oil recovery process whereby a greater amount of residual oil may be obtained than when utilizing a surfactant which contains as one component thereof, sulfonated products which have been derived from other sources or other processes.

The following examples are given for purposes of illustrating a process for preparing the desired mixture of mono- and dialkyl-substituted aromatic hydrocarbons and to a process for sulfonating and neutralizing these compounds. In addition, these examples also illustrate the advantages which may be attained when utilizing these compounds as one component of a surfactant slug and a tertiary oil recovery process. However, it is to be understood that these examples are given merely for purposes of illustration and that the present process is not necessarily limited thereto.

EXAMPLE I

In this example, a stirred autoclave was purged with nitrogen and 33 ml (0.3713 mole) of benzene was charged thereto. The autoclave was then cooled to a temperature of 10° C. and 2000 grams of hydrogen fluoride was charged thereto. The autoclave was then brought to the desired reaction temperature of 40° C. and 2685 ml (1.485 moles) of an alkylating agent comprising a mixture of olefins containing from 10 to 13 carbon atoms in the chain was added during a period of 15 minutes. Upon completion of the addition of the olefin feed, the mixture was then stirred at 40° C. for an additional period of 15 minutes. At the end of this time, stirring was discontinued, the autoclave was cooled to a temperature of about 10° C. and the hydrogen fluoride was withdrawn through a sight glass into a bucket of ice. The hydrocarbon layer was then drained into a mixture of water and calcium carbonate to neutralize any residual hydrogen fluoride which may still be present. After standing, the hydrocarbon product layer was separated and the aqueous phase was washed with pentane. The organic layers were dried over sodium sulfate, filtered and fractionated on a column to remove paraffins, benzenes and olefin. The alkylated products were analyzed by qualitative and quantitative gas chromatography as well as mass spectrometry to determine that there had been a 38.6% yield of monoalkylate and a 40.2% yield of dialkylate along with 18.0% of unknown compounds.

To obtain the sodium sulfate derivative of the alkylated product, 50.0 grams of an alkylate was mixed with an equal volume of hexane, and the mixture was stirred and heated to a temperature of 60° C. A quantity of liquid sulfur trioxide equimolar with the amount of alkylate was placed in a bubbler and introduced into the alkylate solution over a period of 3 hours as a 5% component of a gaseous nitrogen mixture. After completing the addition of sulfur trioxide, the mixture was stirred at the reaction temperature accompanied by a nitrogen sparging for an additional period of 1 to 3 hours. Thereafter, the mixture was then neutralized to a pH of about 8 utilizing a 50 weight percent aqueous sodium hydroxide solution while removing water as an azeotrope using isopropyl alcohol. The precipitated sodium sulfate was removed by filtration from the isopropyl alcohol solution. In addition, the unreacted alkylate was recovered by means of a hexane extraction of the desalted aqueous isopropyl alcohol solution of the product. The desired sodium sulfate derivative of the alkylated benzene was isolated by allowing the solution to evaporate to dryness on a steam bath. The equivalent weight of the sulfonate salt, as determined by titration of free sulfonic acids with sodium hydroxide was determined to be 348, the theoretical equivalent weight of the salt being 374.

EXAMPLE II

In a manner similar to that set forth in Example I above, 240 grams of a monoalkylated benzene in which the alkyl portion of the molecule contained from 10 to 13 carbon atoms was charged to a one-liter autoclave which had been purged with nitrogen. The autoclave was cooled to 10° C. and 350 grams of hydrogen fluoride were added thereto. The autoclave was then brought to the desired reaction temperature of 40° C. and 195 ml of an alkylation agent comprising an olefin containing 11 carbon atoms in the chain was added during a period of 15 minutes. The autoclave was then stirred for an additional period of 15 minutes while maintaining the temperature of 40° C. and a pressure of 64 psig. At the end of the reaction period, stirring was discontinued, the autoclave was cooled to a temperature of 10° C., and hydrogen fluoride was withdrawn. The hydrocarbon layer was then treated in a manner similar to that hereinbefore set forth and the alkylated product was determined by gas chromatographic analysis to comprise 29.8% dialkylated product.

The alkylated product was sulfonated in a manner similar to that described in Example I by treating said product with liquid sulfur trioxide at a temperature of 40° C. After neutralization and recovery, the desired product comprising the sodium sulfonate salt was recovered in a 76% yield. The sodium sulfonate possessed an equivalent weight, as determined by titration of free sulfonic acids with sodium hydroxide, of 421, the theoretical equivalent weight being 400.

EXAMPLE III

In a similar manner, benzene was alkylated by treatment with a propylene tetramer which possessed a branched chain configuration, the reaction was effected in a one-liter stirred autoclave in the presence of hydrogen fluoride catalyst at a temperature of 15° C., the total reaction time being 60 minutes. The reactants comprising benzene and tetramer were present in a mole ratio of 0.33:1 mole of benzene per mole of tetramer. Gas chromatographic analysis of the product determined that there had been a 21% yield of monoalkylated product, a 37.4% yield of dialkylated product, and 42.7% of unknown compounds.

EXAMPLE IV

The interfacial tension measurements of the sodium sulfonate derivatives of the dialkyl-substituted aromatic compounds were obtained by using the spinning drop technique set forth in the article "*Adsorption at Interfaces*," by J. L. Cayias, R. S. Schechter, and W. H. Wade, ACS Symposium Series No. 8, 1975, page 234. Solutions of the dialkyl-substituted aromatic compounds which were prepared according to Examples I and II above were measured against a petroleum sulfonate and to the sulfonate salts derived from the bottoms fraction obtained from commercial detergent grade monoalkylbenzene distillation. The petroleum sulfonate and sulfonates of bottoms derived from an aluminum chloride catalyzed alkylation did not possess as well-defined compositions as did the hydrogen fluoride alkylates. The surfactant compositions which were used in the interfacial tension test comprised an aqueous solution containing 0.07% of the sodium sulfonate derivative of the various alkyl aromatic compounds, 1.0% of sodium chloride and 2.0% by volume of a cosurfactant. The results of these measurements are set forth in Table I below in which the dialkyl-substituted benzene of Example I is designated "A", the dialkylbenzene of Example II is designated "B", the aluminum chloride derived bottoms of monoalkylbenzene is designated "C", the hydrogen fluoride catalyzed monoalkylbenzene bottoms is designated "D", and the petroleum sulfonate is designated "E".

TABLE I

| Surfactants | Minimum IFT (dynes/cm)$^a$ | | EACN Range Where IFT $\leq 10^{-2}$ dynes/cm |
|---|---|---|---|
| | EACN | IFT | |
| A | 16$^b$ | 4.5 × 10$^{-2}$ | 11–16 |
| B | 6$^c$ | 1.7 × 10$^{-3}$ | 6–9 |
| C | 6$^d$ | 1.3 × 10$^{-1}$ | — |
| D | 8$^d$ | 1.3 × 10$^{-1}$ | — |
| E | 10$^d$ | 9.9 × 10$^{-3}$ | 8–16 |

$^a$determined by spinning drop technique
$^b$cosurfactant is n-butanol
$^c$cosurfactant is isobutanol
$^d$cosurfactant is isoamyl alcohol

EXAMPLE V

The sodium chloride tolerance test of the various surfactants was effected by mixing stock solutions of surfactant and alcohol cosurfactants with stock solutions of aqueous sodium chloride. The surfactant concentration was maintained at 2.5% by weight in the final solutions while the concentrations of sodium chloride and alcohols were varied from 1.0 to 5.0 wt. %. After 24 hours, the condition of the test solutions was observed. Various conditions existed, said conditions including clear; slightly cloudy; cloudy; precipitation; separation into clear layers and separation into layers accompanied by precipitation. Clear or slightly cloudy solutions were desired inasmuch as these solutions may then be used in continuous core displacement tests. The results of the tests for 2.5% by weight surfactant at 2.0% by weight sodium chloride and 2.0% by weight n-butanol are set forth in Table II below using the same designation of the surfactants as is found in Table 1.

TABLE II

| Surfactants | Results |
|---|---|
| A | slightly cloudy |
| B | slightly cloudy |
| C | slightly cloudy |
| D | separation into clear layers |
| E | cloudy |

EXAMPLE VI

To evaluate the use of the sulfonated mono- and dialkyl-substituted hydrocarbons which have been obtained from an alkylation process involving the use of hydrogen fluoride as the catalyst as compared to other sulfonated derivatives, a core flood test was performed. In the first test, a dilute surfactant core flooding procedure was followed in which a radial core consisting of Berea sandstone was fired at a temperature of 455° C. for a period of three hours. Thereafter, the sandstone core was saturated with field brine utilizing an evacuation procedure. After saturation had been completed, field brine was injected following which crude oil was injected into the core at a fluid frontal advance rate of 0.5 ft./day. Upon completion of the crude oil injection, 2.0 pore volumes of field brine was injected at a similar fluid frontal advance rate of 0.5 ft./day. Thereafter, 0.15 pore volumes of dilute surfactant was injected at a fluid frontal advance rate of 0.5 ft./day followed by injection of 0.85 pore volumes of polymer and 1.50 pore volumes of fresh water. The dilute surfactants which were tested in these experiments comprised surfactant F which was a mixture of the sodium sulfonate derivative of the product prepared in Example I above plus a cosurfactant comprising an ethoxylated alcohol sulfate. Surfactant slug G comprises a sodium sulfonate derivative of an alkylate obtained from petroleum plus the above cosurfactant, while surfactant slug H was the sodium sulfonate derivative of a mixture containing 10% of monoalkylates, 45% of dialkylates, 40% of diphenyl alkylates and 5% of a synthetic sulfonate plus the cosurfactant. The results of these tests are set forth in Table III below in which the oil recoveries are listed in terms of bulk volume production, pore volume produced, and the amount of oil produced in percent of the quantity of oil present in the core immediately prior to the specified recovery sequence. In the Table (% $S_{or}$) indicates the percentage of water flood residual oil saturation. In addition to the three surfactant slugs which were utilized, a residual oil recovery test was also performed utilizing only the polymer to reduce interfacial tension.

TABLE III

| Surfactant | Final Residual Oil Saturation (Pore Volume) | Tertiary Oil Recovery (% $S_{or}$) | Volume of tertiary Oil Produced (Pore Volume) |
|---|---|---|---|
| F | 0.237 | 34.6 | 0.125 |

TABLE III-continued

| Surfactant | Final Residual Oil Saturation (Pore Volume) | Tertiary Oil Recovery (% $S_{or}$) | Volume of tertiary Oil Produced (Pore Volume) |
| --- | --- | --- | --- |
| G | 0.343 | 10.8 | 0.041 |
| H | 0.300 | 20.6 | 0.078 |
| Polymer | 0.345 | 10.6 | 0.041 |

It is apparent from a comparison of the results obtained in Table III above that a surfactant slug, employing the sodium sulfonate derivatives of a mixture of mono- and dialkyl-substituted aromatic hydrocarbons which have been derived by the hydrogen fluoride catalyzed alkylation of an aromatic hydrocarbon with an olefinic hydrocarbon as one component thereof, will result in the obtention of a greater amount of oil recovered in a tertiary oil process as well as a greater volume of tertiary oil produced with a correspondingly lesser amount of final residual oil still present in the core than that which is obtained when utilizing other surfactant slugs containing dissimilar sodium sulfonated derivatives of other monoalkylates and dialkylates. The order of tertiary oil recovery between dilute surfactant systems and a polymer only system will be F>H>G> polymer.

In addition, a comparison of interfacial tension characteristics of the three surfactant slugs is set forth in Table IV below:

TABLE IV

| Surfactants | Surfactant Conc. % (w/w) | IFT (dynes/cm) |
| --- | --- | --- |
| F | 2.0 | 0.016 |
| G | 2.0 | 1.1 |
| H | 2.0 | 1.4 |

EXAMPLE VII

Another set of tests were run in which a micellar evaluation of the surfactant properties of the various composites were performed. The dilute surfactant evaluation set forth in Example VI above was done with a 2.0% w/w of the slug while the micellar/polymer flood test was done using a 7% w/w ratio. The surfactants which were utilized in this comparative test were identical in nature to those set forth in Example VI above and may also be labeled F, G. and H. The surfactants were utilized to form a microemulsion by adding the surfactant to fresh water and adding thereto a secondary surfactant in the form of an ethoxylated alcohol sulfate. The microemulsion was used in a manner similar to that set forth in Example VI above by being injected into a radial core of Berea sandstone after the sandstone had been saturated with field brine and crude oil. The results of this series of tests are set forth in Table V below:

TABLE V

| Surfactants | Final Residual Oil Saturation (Pore Volume) | Tertiary Oil Recovery (% $S_{or}$) | Volume of Tertiary Oil Produced (Pore Volume) |
| --- | --- | --- | --- |
| F | 0.211 | 35.4 | 0.143 |
| G | 0.240 | 33.0 | 0.118 |
| H | 0.294 | 15.7 | 0.055 |
| Polymer | 0.345 | 10.6 | 0.014 |

Again, these results show that the surfactant slug of the present invention results in a greater recovery of tertiary oil with a correspondingly smaller amount of final residual oil still present in the core than is found when using other surfactant compounds or the polymer alone. The order of tertiary oil recovery from the micellar/polymer blends and the polymer only system are F>G>H> polymer only.

We claim as our invention:

1. In a process for an enhanced oil recovery wherein an aqueous surfactant slug is introduced into a subterranean reservoir of oil to displace said oil from said reservoir, said slug being in a sufficient amount to lower the interfacial tension between said oil and water, the improvement which comprises utilizing as said surfactant slug an aqueous mixture comprising:
  (a) from about 1 to about 10% of a sulfonate of a mixture of mono- and dialkyl-substituted aromatic hydrocarbons prepared by the alkylation of an aromatic hydrocarbon with a straight or branched chain olefinic hydrocarbon containing from about 6 to about 22 carbon atoms in the chain in the presence of hydrogen fluoride at alkylation conditions;
  (b) from about 1 to about 10% of a lower alkyl alcohol containing from about 3 to about 6 carbon atoms; and
  (c) from about 0.1 to about 2% of a nonionic ethoxylated normal alcohol containing from about 12 to about 15 carbon atoms.

2. The process as set forth in claim 1 in which said alkylation conditions include a temperature in the range of from about ambient to about 100° C. and a pressure in the range of from about atmospheric to about 50 atmospheres.

3. The process as set forth in claim 1 in which said aromatic hydrocarbon is present in a molar ratio of from about 3:1 to about 1:10 moles of aromatic hydrocarbon per mole of olefinic hydrocarbon.

4. The process as set forth in claim 1 in which said sulfonate is neutralized by the addition of a compound selected from the group consisting of ammonium hydroxide and a salt of hydroxide of a metal of Groups IA and IIA of the Periodic Table.

5. The process as set forth in claim 4 in which said metal is sodium.

6. The process as set forth in claim 4 in which said metal is potassium.

7. The process as set forth in claim 1 in which said aromatic hydrocarbon is benzene.

8. The process as set forth in claim 1 in which said aromatic hydrocarbon is naphthalene.

9. The process as set forth in claim 1 in which said aromatic hydrocarbon is toluene.

10. The process as set forth in claim 1 in which said aromatic hydrocarbon is ethylbenzene.

* * * * *